US012684266B2

(12) United States Patent

Iimori et al.

(10) Patent No.: US 12,684,266 B2

(45) Date of Patent: Jul. 14, 2026

(54) IMAGE CAPTURING APPARATUS, CONTROL METHOD THEREOF, AND STORAGE MEDIUM

(71) Applicant: CANON KABUSHIKI KAISHA, Tokyo (JP)

(72) Inventors: Kento Iimori, Tokyo (JP); Isao Hayashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 61 days.

(21) Appl. No.: 18/736,909

(22) Filed: Jun. 7, 2024

(65) Prior Publication Data

US 2024/0430592 A1 Dec. 26, 2024

(30) Foreign Application Priority Data

Jun. 23, 2023 (JP) ................................. 2023-103596

(51) Int. Cl.
H04N 25/772 (2023.01)
H04N 25/704 (2023.01)
H04N 25/766 (2023.01)

(52) U.S. Cl.
CPC ......... H04N 25/772 (2023.01); H04N 25/704 (2023.01); H04N 25/766 (2023.01)

(58) Field of Classification Search
CPC .. H04N 25/772; H04N 25/704; H04N 25/766; H04N 25/616; H04N 25/778; H04N 25/78; H04N 23/54; H04N 25/47
See application file for complete search history.

(56) References Cited

U.S. PATENT DOCUMENTS

| | | | | |
|---|---|---|---|---|
| 6,982,403 B2 * | 1/2006 | Yang | ...................... | H04N 25/67 |
| | | | | 250/214 R |
| 7,538,304 B2 * | 5/2009 | Ladd | .................... | H04N 25/671 |
| | | | | 250/214 R |
| 2006/0050163 A1 * | 3/2006 | Wang | ..................... | H04N 25/59 |
| | | | | 348/E3.018 |
| 2010/0002118 A1 * | 1/2010 | Wang | ................... | H04N 25/585 |
| | | | | 348/308 |
| 2013/0222631 A1 * | 8/2013 | Iwane | .................... | H04N 25/60 |
| | | | | 348/222.1 |

(Continued)

FOREIGN PATENT DOCUMENTS

| | | |
|---|---|---|
| JP | 5755111 B2 | 7/2015 |
| JP | 2020014110 A | 1/2020 |
| JP | 2022119484 A | 8/2022 |

*Primary Examiner* — Jason A Flohre

(74) *Attorney, Agent, or Firm* — Cowan, Liebowitz & Latman, P.C.

(57) ABSTRACT

An image capturing apparatus includes a pixel portion in which a plurality of pixels each including a plurality of photoelectric conversion elements are arranged in a matrix, at least three sample-hold circuits, a voltage-current conversion portion configured to output a difference between two sample-hold circuits as a current signal, an AD converter configured to convert an output signal of the voltage-current conversion portion to a digital signal, and a control unit configured to perform control such that, in a period in which a first pixel signal obtained from the pixel is held in one sample-hold circuit, and the first pixel signal is AD converted, an operation is started in which a second pixel signal obtained from the pixel become held in another sample-hold circuit.

8 Claims, 14 Drawing Sheets

(56) References Cited

U.S. PATENT DOCUMENTS

2014/0036121 A1*   2/2014   Minowa ............... H04N 25/778
                                                      348/301
2018/0077337 A1*   3/2018   Fujii  .................... H04N 25/704
2020/0112697 A1*   4/2020   Huang  .................. H04N 25/77
2020/0265909 A1*   8/2020   Matsuura ............. H04N 25/616
2021/0281784 A1*   9/2021   Okada ................. H04N 25/616

* cited by examiner

Figure 1:
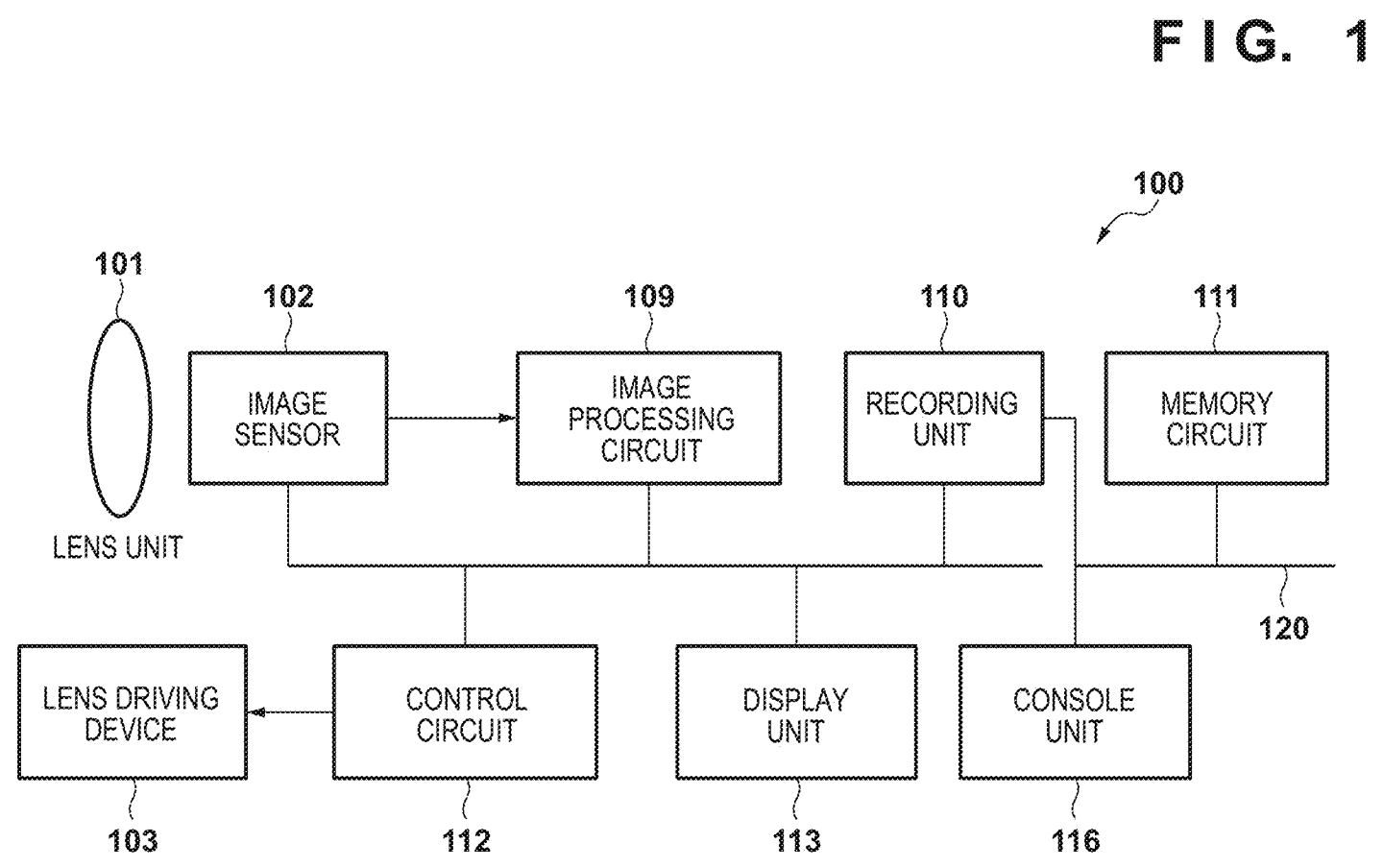

111 MEMORY CIRCUIT

110 RECORDING UNIT

109 IMAGE PROCESSING CIRCUIT

102 IMAGE SENSOR

101 LENS UNIT

120

116 CONSOLE UNIT

113 DISPLAY UNIT

112 CONTROL CIRCUIT

103 LENS DRIVING DEVICE

F I G. 5
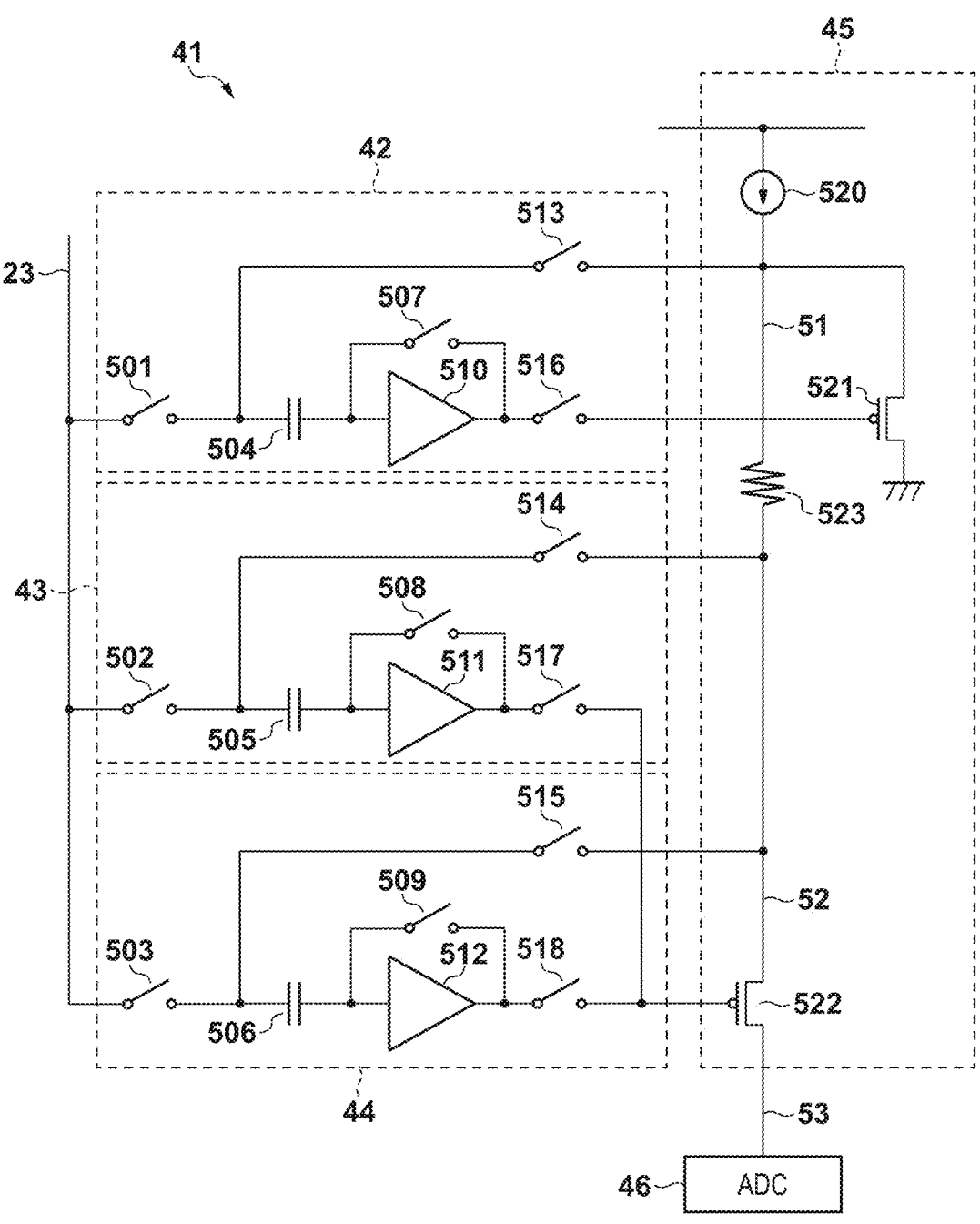

F I G.  9
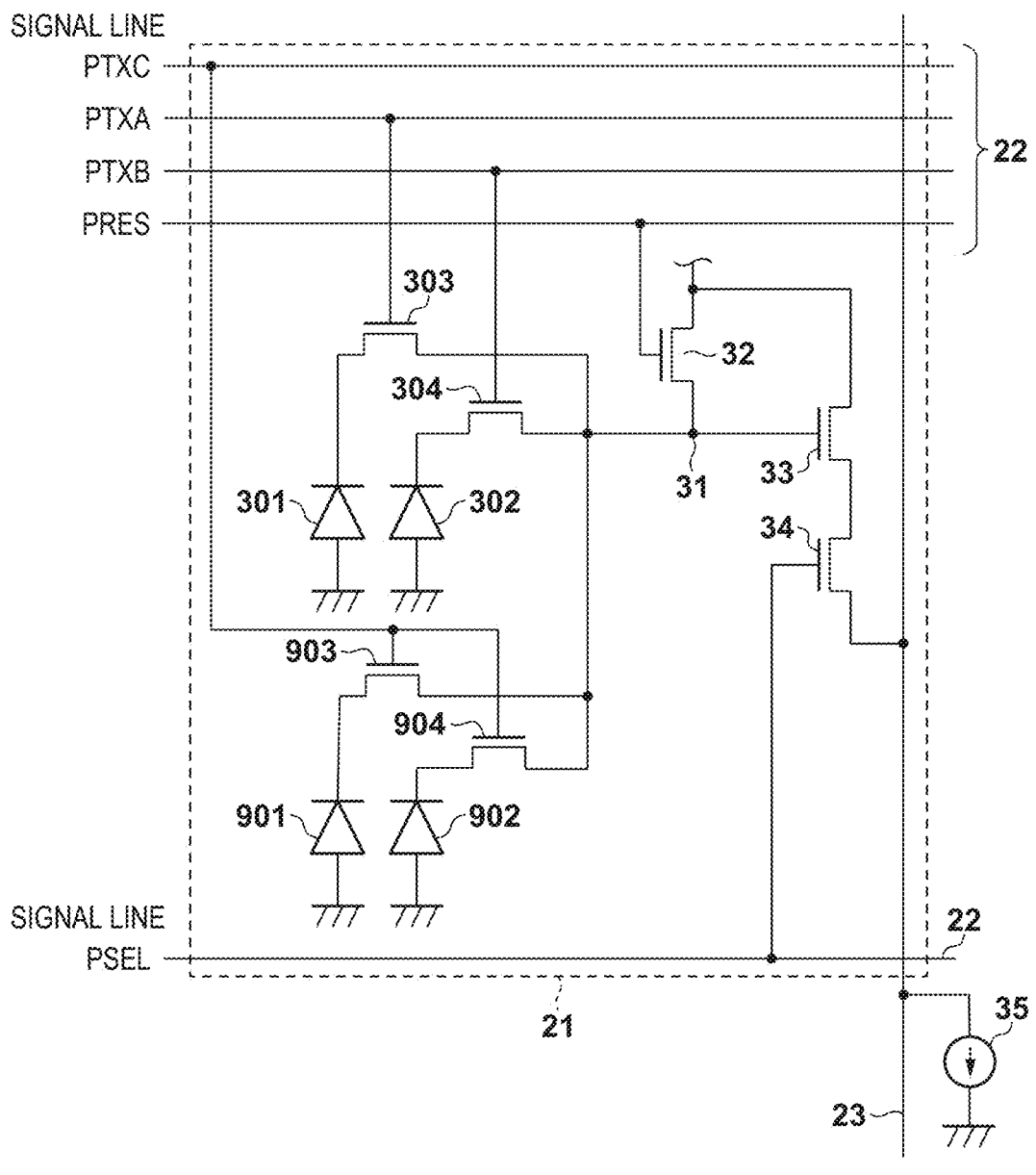

FIG. 12

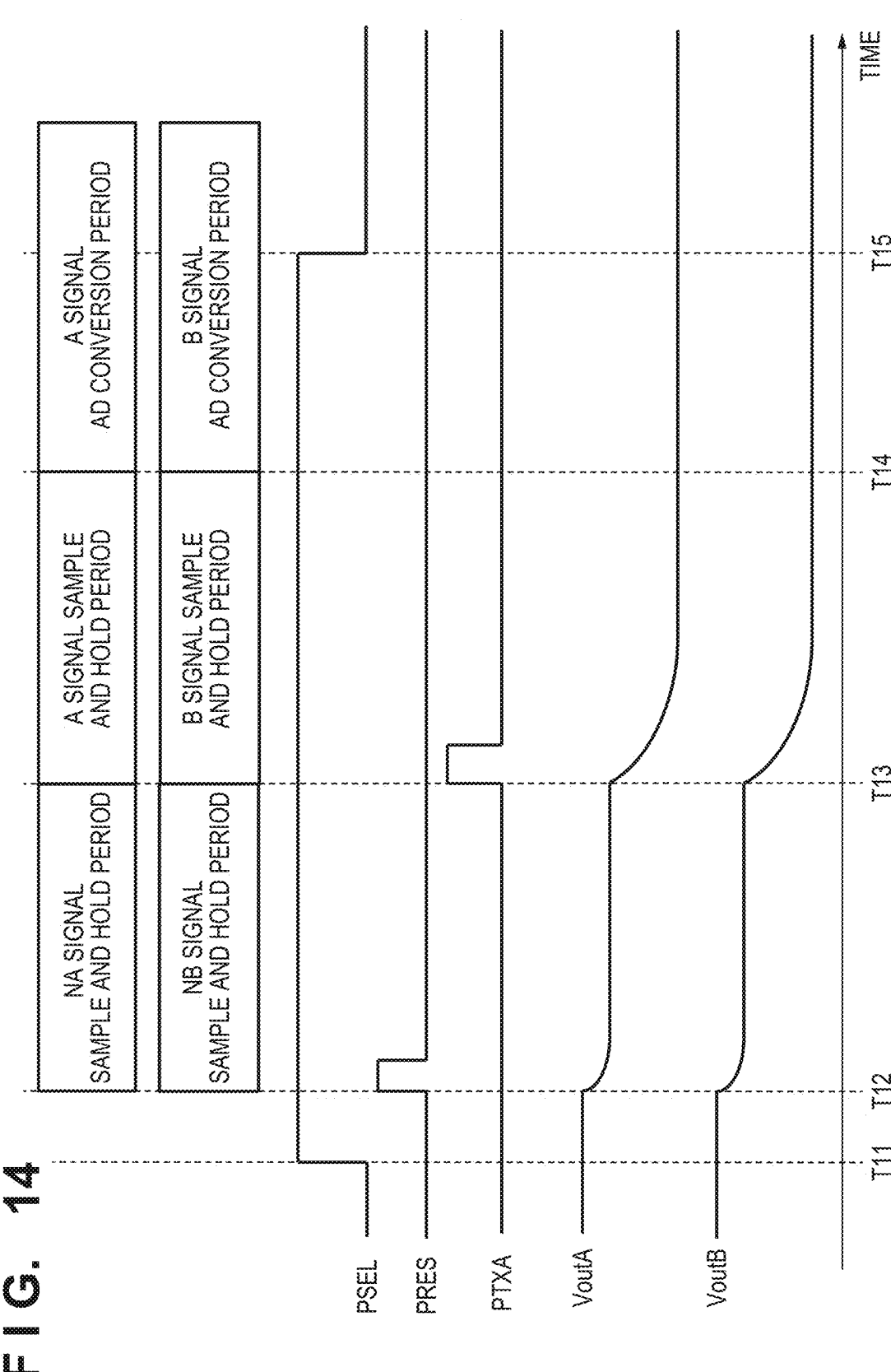

IMAGE CAPTURING APPARATUS, CONTROL METHOD THEREOF, AND STORAGE MEDIUM

BACKGROUND OF THE INVENTION

Field of the Invention

The present invention relates to an image capturing apparatus and a control method thereof.

Description of the Related Art

Heretofore, a technique is known in which a plurality of photoelectric conversion elements are provided in one pixel of an image sensor, and focus detection is performed using output signals from the plurality of photoelectric conversion elements.

In Japanese Patent No. 5755111, an image capturing apparatus is disclosed in which focus detection can be performed using an image sensor in which each pixel includes one microlens and a plurality of photoelectric conversion elements. In Japanese Patent No. 5755111, after a reset signal of one pixel is read out, a signal based on charges of at least one photoelectric conversion element is read out from the one pixel, and thereafter a signal based on charges of the plurality of photoelectric conversion elements are read out from the one pixel.

Also, in Japanese Patent Laid-Open No. 2022-119484, the following configuration of a photoelectric conversion apparatus is disclosed. That is, two sample-hold circuits are provided in parallel with respect to one output line, one sample-hold circuit holds a reset signal of one pixel, and the other sample-hold circuit holds a photodetection signal. Then, a current based on the difference between the photo-detection signal and the reset signal is output to an AD conversion unit, and correction processing is performed using correlated double sampling between the photodetec-tion signal and the reset signal.

However, with the configuration described in Japanese Patent Laid-Open No. 2022-119484, the following process-ing needs to be performed when, with the two sample-hold circuits connected to a signal line, a reset signal read out from one pixel, a signal based on charges of at least one photoelectric conversion element, and a signal based on charges of the plurality of photoelectric conversion elements are to be sample-held.

First, one sample-hold circuit holds the reset signal of one pixel, and the other sample-hold circuit holds a signal based on charges of at least one photoelectric conversion element in the one pixel. After the signal based on the difference is AD converted, the sample-hold circuit that holds the signal based on charges of at least one photoelectric conversion element holds the signal based on charges of the plurality of photoelectric conversion elements in the one pixel. Then, the signal based on the difference from the reset signal is AD converted. As described above, after one AD conversion is performed, AD conversion needs to be performed once again, and therefore there is a problem in that the read-out time increases.

SUMMARY OF THE INVENTION

The present invention has been made in view of the problem described above, and provides an image capturing apparatus that can, when one pixel includes a plurality of photoelectric conversion elements, reduce the signal read-out time.

According to a first aspect of the present invention, there is provided an image capturing apparatus comprising: a pixel portion in which a plurality of pixels each including a plurality of photoelectric conversion elements are arranged in a matrix; at least three sample-hold circuits that are arranged with respect to pixel signals output from one pixel; a voltage-current conversion portion configured to output a difference between two sample-hold circuits, out of the at least three sample-hold circuits, as a current signal; an AD converter configured to convert an output signal of the voltage-current conversion portion to a digital signal; and at least one processor or circuit configured to function as: a control unit configured to perform control such that, in a period in which a first pixel signal obtained from the pixel is held in one sample-hold circuit, out of the at least three sample-hold circuits, and the first pixel signal is AD con-verted, an operation is started in which a second pixel signal obtained from the pixel become held in another sample-hold circuit, out of the at least three sample-hold circuits.

According to a second aspect of the present invention, there is provided a method of controlling an image capturing apparatus including: a pixel portion in which a plurality of pixels each including a plurality of photoelectric conversion elements are arranged in a matrix; at least three sample-hold circuits that are arranged with respect to pixel signals output from one pixel; a voltage-current conversion portion con-figured to output a difference between two sample-hold circuits, out of the at least three sample-hold circuits, as a current signal; and an AD converter configured to convert an output signal of the voltage-current conversion portion to a digital signal, the method comprising: performing control such that, in a period in which a first pixel signal obtained from the pixel is held in one sample-hold circuit, out of the at least three sample-hold circuits, and the first pixel signal is AD converted, an operation is started in which a second pixel signal obtained from the pixel become held in another sample-hold circuit, out of the at least three sample-hold circuits.

Further features of the present invention will become apparent from the following description of exemplary embodiments with reference to the attached drawings.

BRIEF DESCRIPTION OF THE DRAWINGS

FIG. 1 is a block diagram of an image capturing appara-tus.

FIG. 5 is a diagram illustrating an exemplary configura-tion of the column circuit.

FIG. 9 is an equivalent circuit diagram of a unit pixel of a third embodiment.

FIG. 12 is an equivalent circuit diagram of a unit pixel of a fourth embodiment.

FIG. 14 is a timing chart of the fourth embodiment.

DESCRIPTION OF THE EMBODIMENTS

Figure 2:
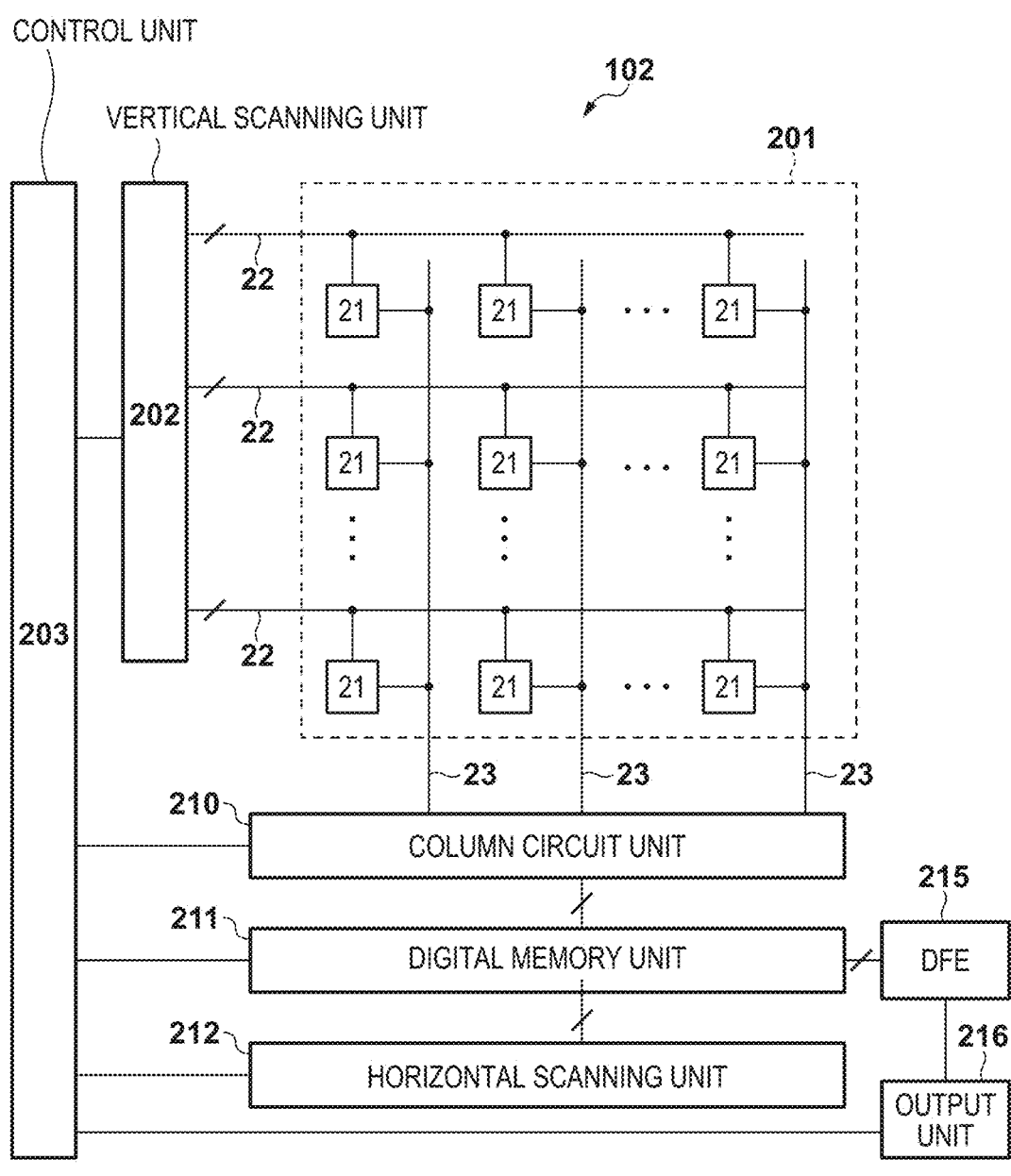
FIG. 2 is a simplified configuration diagram of an image sensor.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

FIG. 1 in a block diagram illustrating a configuration of an image capturing apparatus according to an embodiment of the present invention. An image capturing apparatus 100 is an image capturing apparatus that can perform focus detection on an imaging plane.

A lens unit 101 collects incident light from a subject, and forms a subject image on an image sensor 102. The lens unit 101 is constituted by a plurality of lenses, an aperture, and the like, for example, and zoom control, focus control, aperture control, and the like are performed thereon by a lens driving device 103.

A control circuit 112 performs some of control of image processing of an image processing circuit 109 and driving of an image sensor 102. Also, the control circuit 112 controls reception of instructions from a display unit 113 and a console unit 116, and data transfer to and from a memory circuit 111 and a recording unit 110. Also, the control circuit 112 performs focus detection computation based on image data from the image processing circuit 109, and causes the lens driving device 103 to perform focus adjustment by the lens unit 101. Note that the control circuit 112 may be incorporated in the image sensor 102 or the image processing circuit 109, for example.

The image processing circuit 109 performs development processing such as color matrix processing and gamma processing on image data from the image sensor 102. In such processing, the image processing circuit 109 causes the memory circuit 111 to retain image data, as needed. Also, the image processing circuit 109 outputs processed image data to the display unit 113 or the recording unit 110. The display unit 113 includes a display device for displaying processed image data and the like. The console unit 116 generates an operation signal according to the operation performed by a user. A bus 120 is a common path for exchanging data between the image sensor 102, the image processing circuit 109, the display unit 113, the console unit 116, the recording unit 110, and the memory circuit 111.

FIG. 2 is a simplified configuration diagram of the image sensor 102. The image sensor 102 includes a pixel array portion 201, a vertical scanning unit 202, a column circuit unit 210, and a digital memory unit 211, as shown in FIG. 2. Also, the image sensor 102 includes a horizontal scanning unit 212, a digital signal processing unit 215 (may also be denoted as Digital Front End (DFE)), an output unit 216, and a control unit 203.

In the pixel array portion 201, a plurality of pixels 21 are arranged in a matrix, a line in a vertical direction is referred to as a "column", and a line in a horizontal direction is referred to as a "row". A portion of the plurality of pixels 21 that constitute the pixel array portion 201 is shown in FIG. 2, for the sake of convenience.

A control signal line 22 is arranged in each row of the pixel array portion 201. The control signal lines 22 each include a plurality of control signal lines for supplying a plurality of types of control signals to a plurality of pixels 21. The control signal line 22 in each row is connected to the vertical scanning unit 202.

A column output line 23 is arranged in each column of the pixel array portion 201. The number of column output lines 23 for one column need not be one in the pixel array, and may be two or more. The column output line 23 is connected to the column circuit unit 210.

The vertical scanning unit 202 receives a control signal output from the control unit 203, and generates control signals for driving the plurality of pixels 21, and supplies the control signals to the plurality of pixels 21 through the control signal lines 22. A logic circuit such as a shift register or an address decoder is used in the vertical scanning unit 202. The vertical scanning unit 202 performs control such that signals are read out by selecting a plurality of pixels 21 in the pixel array portion 201 in units of row, and the signals of the plurality of pixels 21 are output to the column circuit unit 210 through the column output lines 23.

The column circuit unit 210 includes a plurality of sample-hold circuits for holding signals of the output lines, a plurality of voltage-current conversion circuits, and a plurality of AD converters, and performs signal processing including correlated double sampling and AD conversion. A specific configuration of the column circuit unit 210 will be described later.

The digital memory unit 211 is connected to the column circuit unit 210, and has a function of retaining a digital signal for each column that is obtained by performing AD conversion in the column circuit unit 210. The digital memory unit 211 is connected to the control unit 203, and receives a control signal for retaining a digital signal output from the column circuit unit 210, from the control unit 203.

The horizontal scanning unit 212 is connected to the control unit 203, and generates a control signal for reading out a digital signal retained in the digital memory unit 211, based on a control signal from the control unit 203. Then, the horizontal scanning unit 212 causes the digital signals retained in the digital memory unit 211 to be output to the digital signal processing unit 215.

The digital signal processing unit 215 executes signal processing such as amplification processing and correction processing on a digital signal output from the digital memory unit 211.

The output unit 216 is controlled by a control signal from the control unit 203, and is an external interface circuit for outputting a signal input from the digital signal processing unit 215 to an external apparatus. The control unit 203 supplies control signals to the vertical scanning unit 202, the column circuit unit 210, the digital memory unit 211, the horizontal scanning unit 212, and the output unit 216 for controlling the respective units. Note that these control signals need not be supplied from the control unit 203, and may be supplied from the outside of the image sensor 102.

Figure 3:
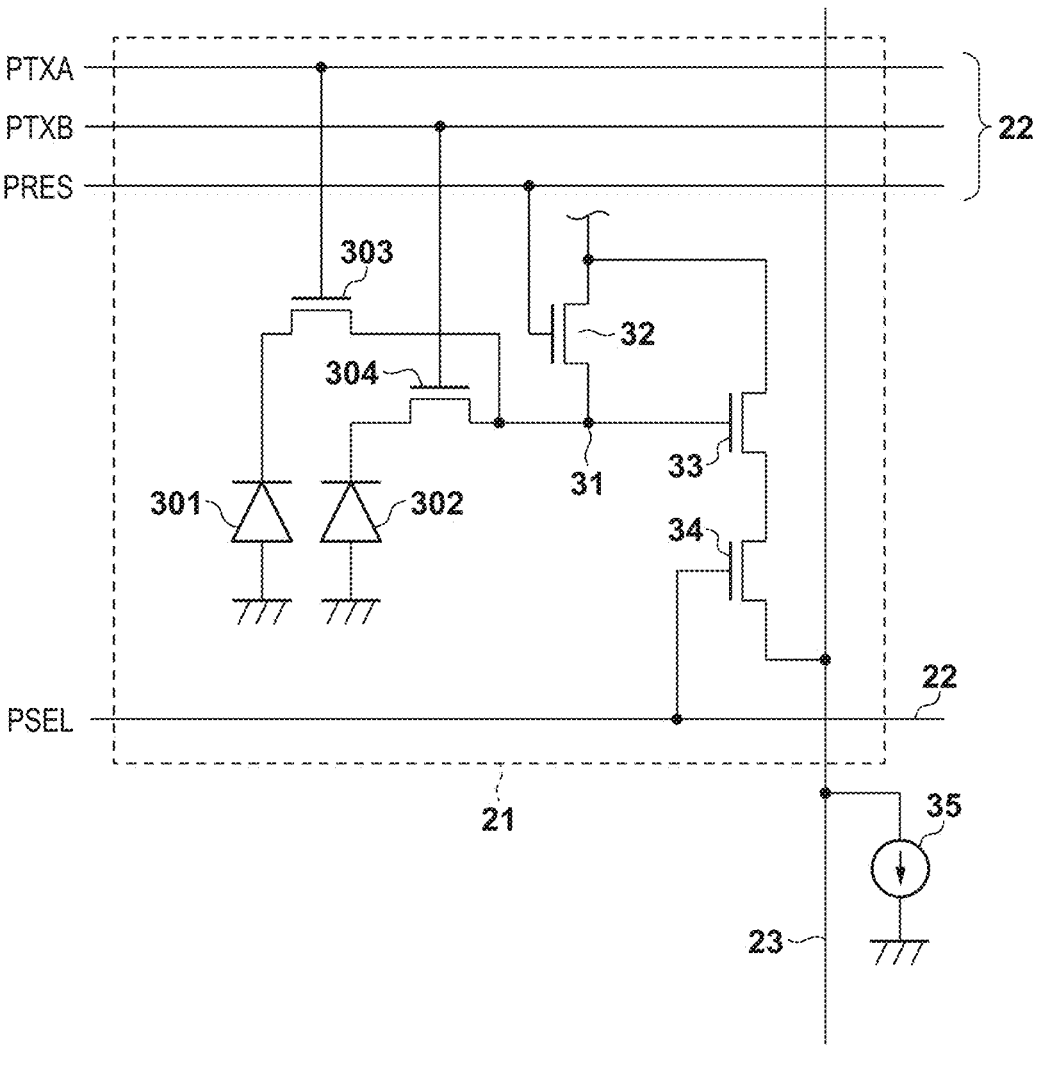
FIG. 3 is an equivalent circuit diagram of a unit pixel.

FIG. 3 is a simplified equivalent circuit of a pixel 21. As shown in FIG. 3, the pixel 21 includes a first photoelectric conversion portion 301, a second photoelectric conversion portion 302, a first transfer transistor 303, and a second transfer transistor 304. The pixel 21 further includes a reset transistor 32, an amplification transistor 33, a selection transistor 34, and a floating diffusion portion 31.

The first transfer transistor 303, the second transfer transistor 304, the reset transistor 32, the amplification transistor 33, and the selection transistor 34 are each constituted by an NMOS transistor, for example, but may also be constituted by another transistor.

Each pixel 21 includes a microlens and a color filter, which are not illustrated, on a light path through which incident light is guided to the first photoelectric conversion portion 301 and the second photoelectric conversion portion 302. The first photoelectric conversion portion 301 and the second photoelectric conversion portion 302 are photodiodes, for example.

The first transfer transistor 303 and the second transfer transistor 304 are connected in correspondence with the first photoelectric conversion portion 301 and the second photoelectric conversion portion 302, respectively. Also, these transfer transistors are each for transferring a signal of the corresponding photoelectric conversion element to the floating diffusion portion 31, which is an input node of the amplification transistor 33.

The floating diffusion portion 31 includes a capacitance component (floating diffusion capacitance) formed by an interconnect capacitance and the like, and has a function of a charge holding portion.

The reset transistor 32 is connected to the floating diffusion portion 31, which is the input node of the amplification transistor 33, and supplies a reset voltage thereto. The drains of the reset transistor 32 and amplification transistor 33 are connected to a power supply voltage node.

The amplification transistor 33 amplifies a signal transferred to the floating diffusion portion 31, which is the input node, and outputs the amplified signal to the column output line 23. The selection transistor 34 controls the electrical conduction between the amplification transistor 33 and the column output line 23.

A current source 35 is electrically connected to the column output line 23. The current source 35 supplies a bias current to the amplification transistor 33, and the amplification transistor 33 and the current source 35 constitute a source follower.

The control signal line 22 from the vertical scanning unit 202 is connected to the first transfer transistor 303, the second transfer transistor 304, the reset transistor 32, the amplification transistor 33, and the selection transistor 34. The control signal line 22 includes four signal lines to which control signals PTXA, PTXB, PRES, and PSEL are respectively supplied. These four signal lines are signal lines that are shared by pixels 21 belonging to a corresponding row.

Out of the four signal lines in each row, the signal line of the control signal PTXA is connected to the gate of the first transfer transistor 303, in the pixel 21 of the corresponding row. The signal line of the control signal PTXB is connected to the gate of the second transfer transistor 304. The signal line of the control signal PRES is connected to the gate of the reset transistor 32. The signal line of the control signal PSEL is connected to the gate of the selection transistor 34.

Figure 4:
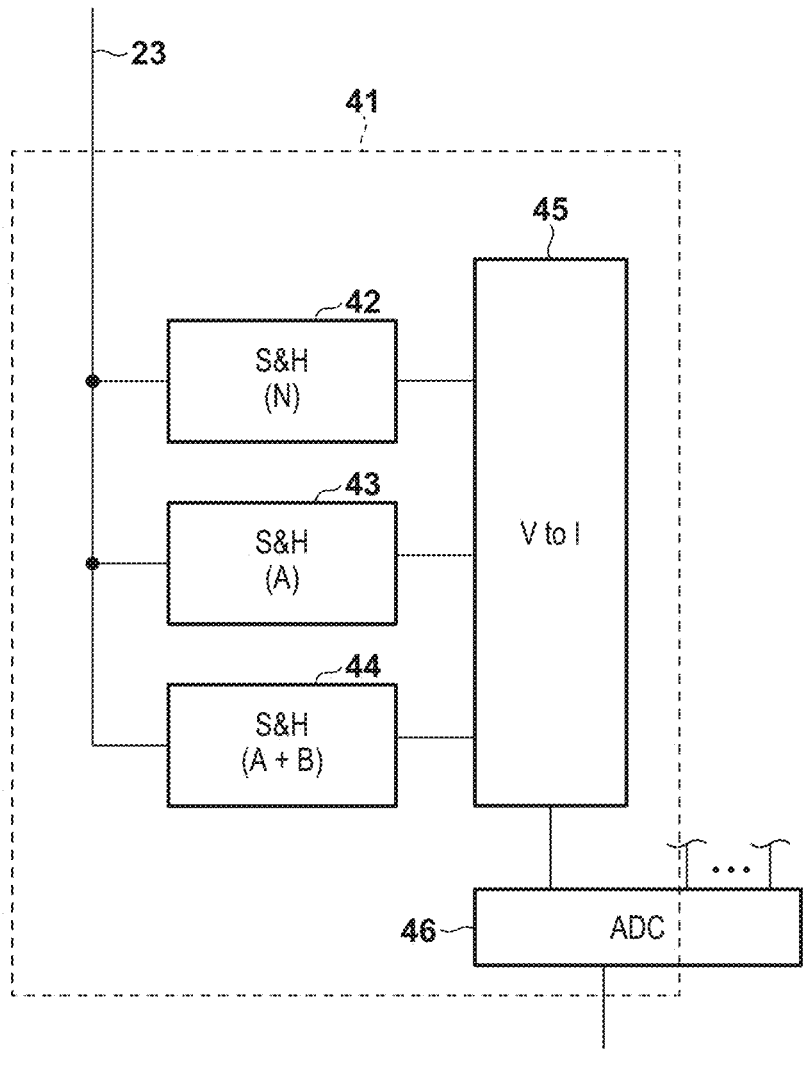
FIG. 4 is a simplified block diagram of a column circuit.

FIG. 4 is a simplified block diagram of a column circuit 41. The column circuit unit 210 is constituted by a plurality of column circuits 41. Each column circuit 41 is connected to at least one of the plurality of column output lines 23 of the pixel array portion 201. In FIG. 4, the column output line 23 is connected to a first sample-hold circuit 42, a second sample-hold circuit 43, and a third sample-hold circuit 44. The first sample-hold circuit 42, second sample-hold circuit 43, and third sample-hold circuit 44 each hold the potential of the column output line 23 at a predetermined time, the operations being controlled by a plurality of control signals (not illustrated) supplied by the control unit 203. Also, these sample-hold circuits can each supply the held potential to a voltage-current conversion circuit 45. The first sample-hold circuit 42 holds a later-described N signal. The second sample-hold circuit 43 holds a later-described A signal. The third sample-hold circuit 44 holds a later-described A+B signal.

The voltage-current conversion circuit 45 switches, by a control signal (not illustrated) supplied by the control unit 203, the current signal between a current signal based on a potential difference between the first sample-hold circuit 42 and the second sample-hold circuit 43 and a current signal based on a potential difference between the first sample-hold circuit 42 and the third sample-hold circuit, and outputs the resultant current signal to an AD converter 46.

The AD converter 46 is an AD converter that converts an output current signal of the voltage-current conversion circuit 45 to a digital signal, but may also be connected to a voltage-current conversion circuit of another column circuit, and perform AD conversion on a signal output therefrom. The AD converter 46 is a delta-sigma (AZ) type AD conversion circuit, for example, but there is no limitation to this.

FIG. 5 is a circuit diagram illustrating an exemplary configuration of the column circuit 41. The first sample-hold circuit 42, second sample-hold circuit 43, and third sample-hold circuit 44 are connected to the column output line 23 via a switch 501, a switch 502, and a switch 503, respectively. The switch 501, switch 502, and switch 503 are controlled by control signals (not illustrated) from the control unit 203, and are for selecting which of the sample-hold circuit is to hold the potential of the column output line 23.

The first sample-hold circuit 42, second sample-hold circuit 43, and third sample-hold circuit 44 respectively include a capacitor 504, a capacitor 505, and a capacitor 506 for holding a signal. One ends of these capacitors are respectively connected to the switch 501, switch 502, and switch 503, and the other ends thereof are respectively connected to an inverting amplifier 510, an inverting amplifier 511, and an inverting amplifier 512.

A switch 507, a switch 508, and a switch 509 are respectively connected between input nodes and output nodes of the respective inverting amplifier 510, inverting amplifier 511, and inverting amplifier 512. A switch 513, a switch 514, and a switch 515 are respectively provided between nodes of the switch 501, switch 502, and switch 503 on a side opposite to the column output line 23 and the voltage-current conversion circuit 45. The switch 513 is connected to an interconnect 51, and the switch 514 and switch 515 are connected to an interconnect 52. A switch 516, a switch 517, and a switch 518 are respectively provided between the output nodes or the inverting amplifier 510, inverting amplifier 511, and inverting amplifier 512 and the voltage-current conversion circuit 45. The switch 516 is connected to a PMOS transistor 521, and the switch 517 and switch 518 are connected to a PMOS transistor 522.

The voltage-current conversion circuit 45 includes a current source 520, a resistor 523, the PMOS transistor 521, the PMOS transistor 522, the interconnect 51, the interconnect 52, and an interconnect 53. The current source 520 is arranged between a power supply voltage node and the interconnect 51, and the resistor 523 is arranged between the interconnect 51 and the interconnect 52. The PMOS transistor 522 that function as a source follower is arranged between the interconnect 53 and the interconnect 52, and the PMOS transistor 521 that function as a source follower is arranged between the interconnect 51 and ground. The voltage-current conversion circuit 45 performs processing for converting the potential difference between the interconnect 51 and interconnect 52 to a current signal, and transfers the current signal to the AD converter 46.

Figure 6:
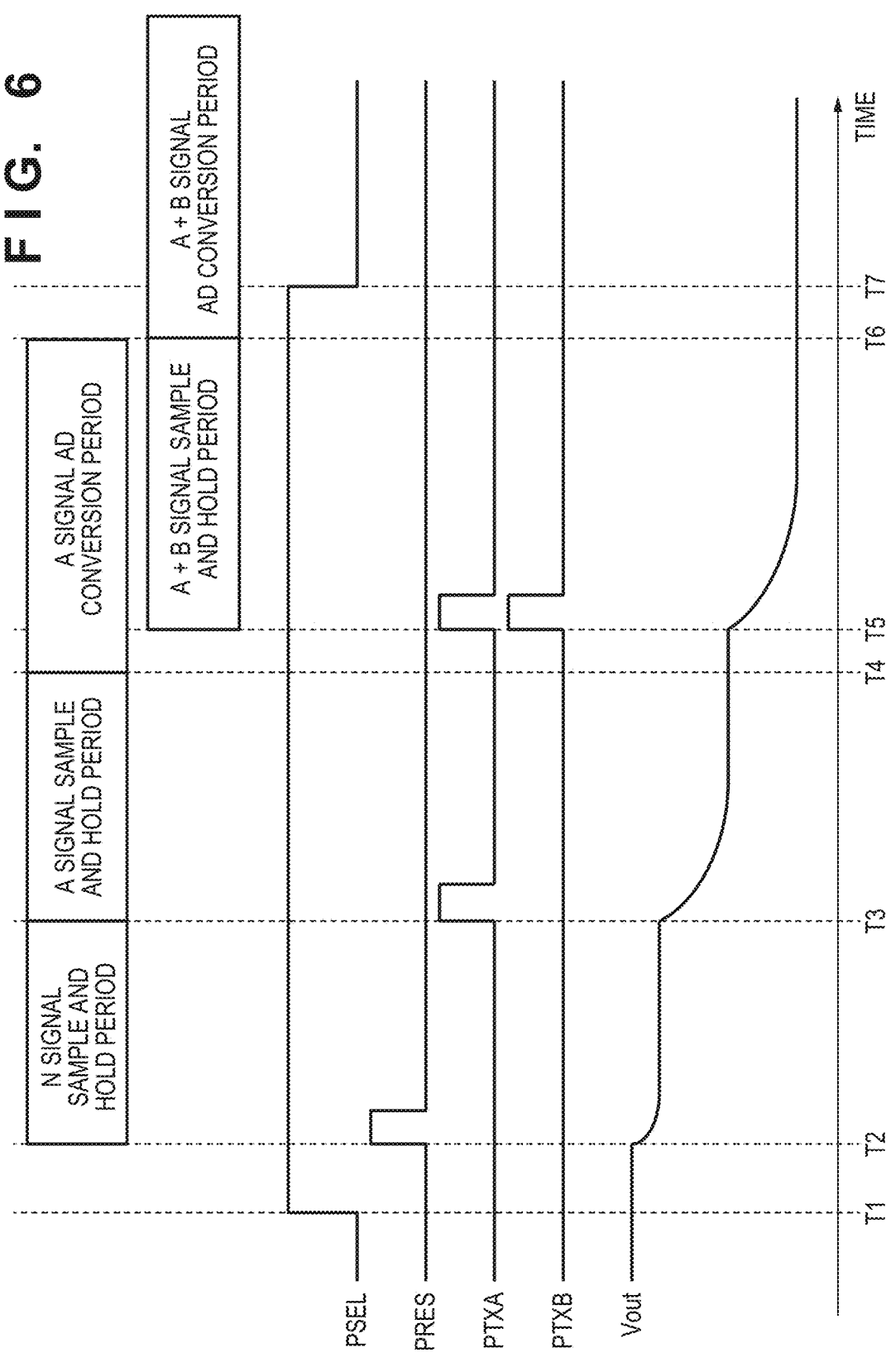
FIG. 6 is a timing chart of a read-out operation.

FIG. 6 is a timing chart illustrating an example of a pixel signal read-out operation from the pixel 21 to the AD converter 46.

In FIG. 6, the control signals PSEL, PRES, PTXA, and PTXB that are output from the vertical scanning unit 202 to pixels 21 on one row, and an output potential Vout that is output from a pixel 21 to a column output line 23 of the corresponding column are shown. In a period prior to time T1, the control signals PSEL, PRES, PTXA, and PTXB are assumed to be at a Low level (hereinafter, denoted as a "L level"). Also, charges corresponding to an incident light amount are assumed to be accumulated in the first photoelectric conversion portion 301 and the second photoelectric conversion portion 302. Also, it is assumed that the switch 507, switch 508, and switch 509 in the column circuit 41 are in a closed state, and the other switches in the column circuit 41 are in an open state.

At time T1, the vertical scanning unit 202 controls the control signal PSEL to transition from an L level to a High level (hereinafter, denoted as an "H level"). Accordingly, the selection transistor 34 is turned on, and the source of the amplification transistor 33 is connected to the column output line 23 via the selection transistor 34. Here, the number of pixels connected to the column output line 23 is not limited to one, and a plurality of pixels on a different column or row on which the same operation is to be performed may be connected at the same time.

In a next predetermined period from time T2, the vertical scanning unit 202 controls the control signal PRES to transition from an L level to an H level. Accordingly, the reset transistor 32 is turned on, and the floating diffusion portion 31 is reset to a predetermined potential (reset potential) according to the reference potential. This state is the reset state of the pixel 21. With this, the output potential Vout of the column output line 23 becomes a potential according to the reset potential of the floating diffusion portion 31. This potential becomes held, during a period after the reset transistor 32 is turned off and the potential of the column output line 23 stabilizes until time T3, in the capacitor 504, capacitor 505, and capacitor 506 as a reset signal (also denoted as an "N signal") as a result of the switch 501, switch 502, and switch 503 being turned on and off. The period from time T2 to time T3 includes a stabilizing time of the column output line 23 and a write time of the N signal to the capacitor 504, capacitor 505, and capacitor 506, and is denoted as an "N signal sample-hold period".

In a next predetermined period from time T3, the vertical scanning unit 202 controls the control signal PTXA to transition from an L level to an H level. Accordingly, the first transfer transistor 303 is turned on, and the charges accumulated in the first photoelectric conversion portion 301 are transferred to the floating diffusion portion 31, and the potential of the floating diffusion portion 31 becomes a potential according to the amount of charges transferred from the photoelectric conversion portion. Accordingly, the output potential Vout of the column output line 23 becomes a potential according to the amount of charges transferred to the floating diffusion portion 31. This potential becomes held, during a period after the first transfer transistor 303 is turned off and the potential of the column output line 23 stabilizes until time T4 in the capacitor 505 as a photodetection signal for focus detection (also denoted as an "A signal") as a result of the switch 502 being turned on and off. The period from time T3 to time T4 includes a stabilizing time of the column output line 23 and a write time of the A signal to the capacitor 505, and is denoted as an "A signal sample-hold period".

In a next predetermined period from time T4, the switch 507 and switch 508 are turned off, and the switch 513, switch 516, switch 514, and switch 517 are turned on by control signals (not illustrated) output from the control unit 203. Here, the potential of the interconnect 51 becomes a potential based on the N signal held in the capacitor 504, and the potential of the interconnect 52 becomes a potential based on the A signal held in the capacitor 505. A current according to the potential difference between the interconnect 51 and the interconnect 52 flows through the resistor 523, and a current signal subjected to correction processing by correlated double sampling based on the A signal and N signal is taken out to the interconnect 53 connected to the AD converter 46. The current signal of the interconnect 53 is input to the AD converter 46, converted to a digital signal, and the converted digital signal is stored in the digital memory unit 211.

The period from time T4 until this converted digital signal is obtained is denoted as an "A signal AD conversion period".

In a predetermined period from time T5 in the A signal AD conversion period, the vertical scanning unit 202 controls the control signal PTXA to transition from an L level to an H level. Also, the vertical scanning unit 202 controls the control signal PTXB to transition from an L level to an H level such that the control signal PTXB is at an H level in at least a portion of the H level period of the control signal PTXA. With this, the first transfer transistor 303 and second transfer transistor 304 are turned on. Also, the charges accumulated in the first photoelectric conversion portion 301 and the charges accumulated in the second photoelectric conversion portion 302 can be transferred to the floating diffusion portion 31 at the same time. That is, the potential of the floating diffusion portion 31 becomes a potential according to the amount of charges transferred from the two photoelectric conversion portions. Accordingly, the output potential Vout of the column output line 23 becomes a potential according to the charges transferred to the floating diffusion portion 31. This potential becomes held in the capacitor 506 as a photodetection signal (also denoted as an "A+B signal") for image forming, in a period after the first transfer transistor 303 and second transfer transistor 304 are turned off and the potential of the column output line 23 stabilizes until time T6 due to the switch 503 being turned on and off. The period from time T5 to time T6 is denoted as an "A+B signal sample-hold period". The A+B signal sample-hold period is started in the A signal AD conversion period, and therefore the AD conversion of the A signal and the sample-hold operation of the A+B signal are performed in parallel. With this, the speed of the read-out operation of the pixel signal can be increased. Here, the time T5 may be same as the time T4.

At time T6 next, the switch 514, switch 517, and switch 509 are turned off, and the switch 515 and switch 518 are turned on by control signals (not illustrated) output from the control unit 203. Here, the potential of the interconnect 51 becomes a potential based on the N signal held in the capacitor 504, and the potential of the interconnect 52 becomes a potential based on the A+B signal held in the capacitor 506. A current according to the potential difference between the interconnect 51 and the interconnect 52 flows through the resistor 523. Accordingly, a current signal subjected to correction processing by correlated double sampling based on the A+B signal and N signal is taken out to the interconnect 53 connected to the AD converter 46. The current signal of the interconnect 53 is input to the AD converter 46, converted to a digital signal, and the converted digital signal is stored in the digital memory unit 211. The period from time T6 until this converted digital signal is obtained is denoted as an "A+B signal AD conversion period". Because one AD converter 46 is present, the A+B signal AD conversion period need to be started after the A signal AD conversion period is ended.

At time T7 next, the vertical scanning unit 202 controls the control signal PSEL to transition from an H level to an L level. With this, the selection transistor 34 is turned off, and the source of the amplification transistor 33 is cut off from the column output line 23. When the operation at time T7 and the A+B signal AD conversion period are ended, the operation for reading out signals of the pixels 21 belonging to the one row to the corresponding AD converters 46 via the respective column output lines 23 is ended.

In the first embodiment, three sample-hold circuits are included. Therefore, in a period in which the AD conversion of the A signal is performed using the first sample-hold circuit and second sample-hold circuit, the sample-hold operation of the A+B signal using the third sample-hold circuit can be started. Accordingly, the read-out time of a signal from a pixel can be reduced.

Second Embodiment

In the first embodiment described above, one voltage-current conversion circuit and one AD converter are connected to three sample-hold circuits, but with this configuration, since only one AD converter is present, the AD conversion of the A+B signal needs to be performed after the AD conversion of the A signal. Therefore if the AD conversion period of the A signal is long, the wait time from when the sample-hold operation of the A+B signal is ended until the AD conversion of the A+B signal is started increases, and the read-out time increases. The second embodiment differs from the first embodiment in that two voltage-current conversion circuits and two AD converters are provided such that AD conversions can be performed in parallel even in a case in which the AD conversion is long.

The second embodiment of the present invention will be described using FIGS. 7 and 8.

Figure 7:
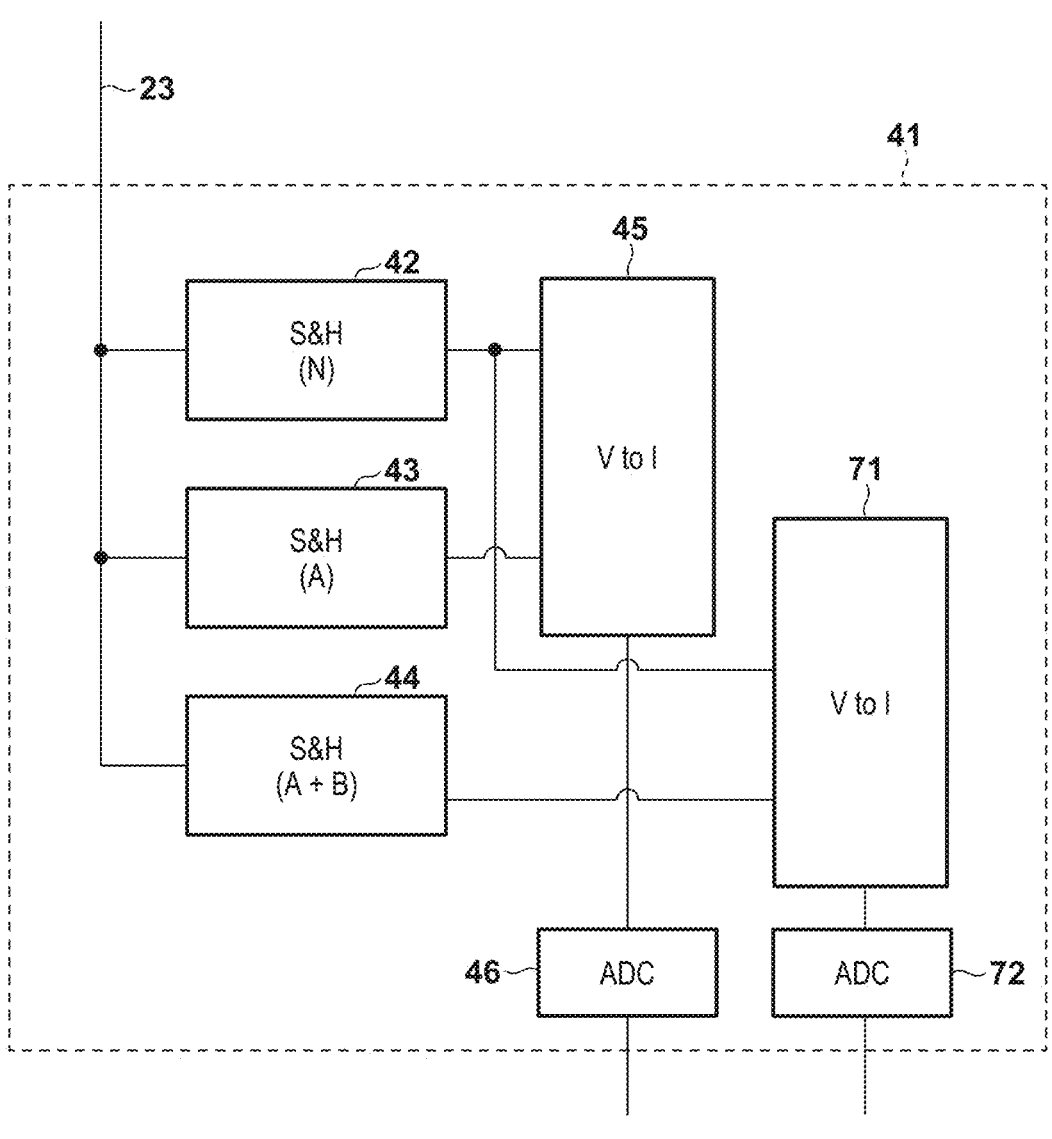
FIG. 7 is a simplified block diagram of a column circuit of a second embodiment.
Figure 8:
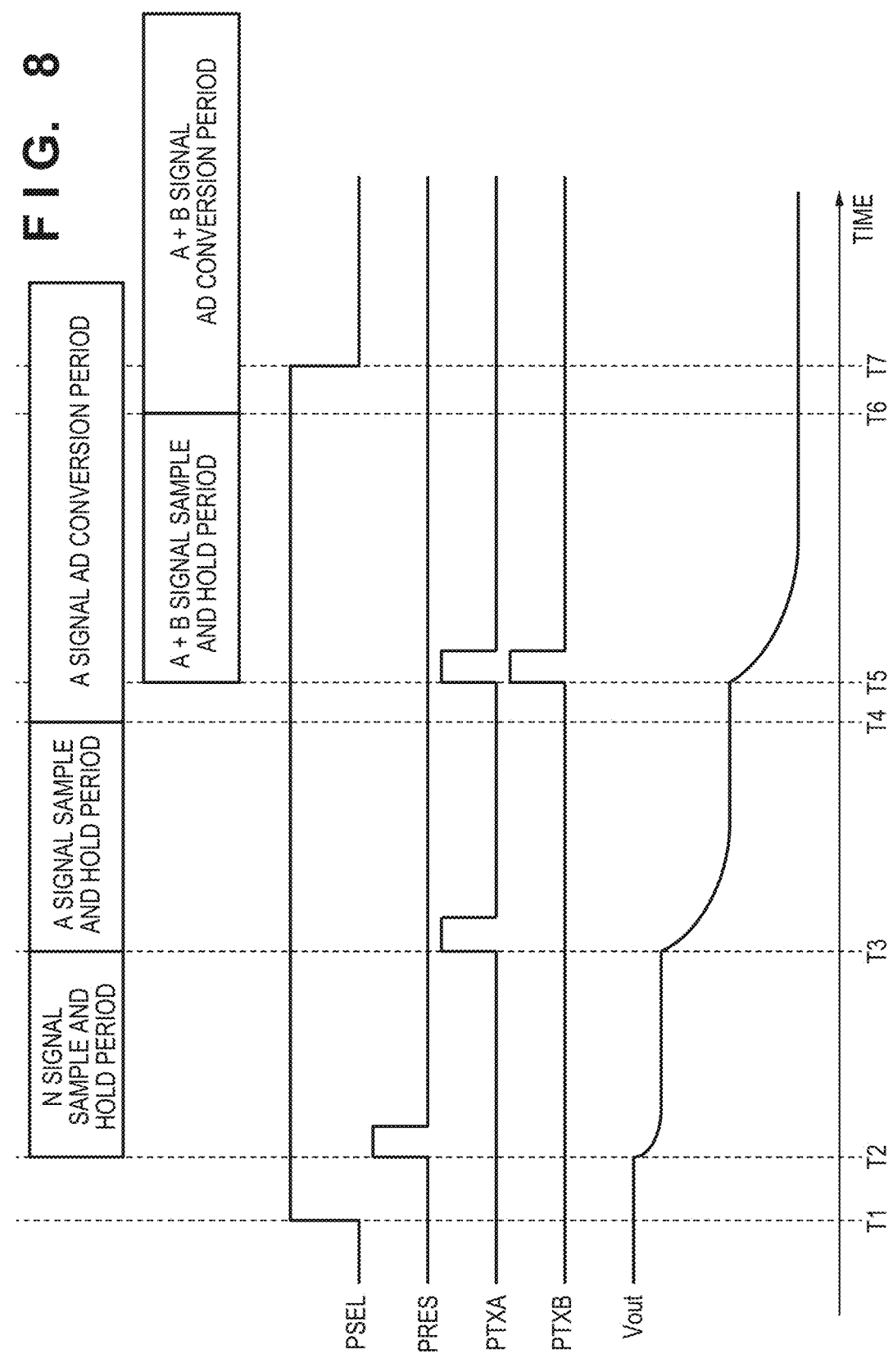
FIG. 8 is a timing chart of the second embodiment.

In FIGS. 7 and 8, the constituent elements similar to those of the first embodiment will be given the same reference numerals, and the description thereof will be omitted or simplified.

FIG. 7 is a simplified block diagram illustrating one example of a column circuit in the second embodiment. A voltage-current conversion circuit 71 and an AD converter 72 are added to the arrangement of the pixel configuration of the first embodiment. The voltage-current conversion circuit 71 is connected to the sample-hold circuit 42 that holds the N signal and the sample-hold circuit 44 that holds the A+B signal. The voltage-current conversion circuit 71 outputs a current signal based on the difference between the potential held in the sample-hold circuit 42 and the potential held in the sample-hold circuit 44 to the AD converter 72.

The voltage-current conversion circuit 45 is connected to the sample-hold circuit 42 that holds the N signal and the sample-hold circuit 43 that holds the A signal. The voltage-current conversion circuit 45 outputs a current signal based on the difference between the potential held in the sample-hold circuit 42 and the potential held in the sample-hold circuit 43 to the AD converter 46.

The AD converter 46 and AD converter 72 each convert an input analog current signal to a digital signal, and output the converted digital signal to the digital memory unit 211.

FIG. 8 is a timing chart illustrating an example of a read-out operation of the pixel signal from a pixel to an AD converter in the second embodiment. The operations prior to time T1 and from time T1 to time T4 are the same as those of the first embodiment, and therefore the description thereof will be omitted.

At time T4, the N signal and the A signal are respectively held in the sample-hold circuit 42 and the sample-hold circuit 43. From time T4, outputting of a current signal based on the potential difference between the A signal and the N signal to the AD converter 46, in the voltage-current conversion circuit 45, and a conversion operation to a digital signal in the AD converter 46 are started. The period from time T4 until the A signal is converted to a digital signal is denoted as an "A signal AD conversion period".

At time T5 next, the first transfer transistor 303 and second transfer transistor 304 are turned on. After Vout stabilizes at the potential of the A+B signal, a holding operation of the A+B signal is performed in the sample-hold circuit 44. The time at which the holding operation of the A+B signal is completed in the sample-hold circuit 44 is time T6, and the period from time T5 to time T6 is denoted as an "A+B signal sample-hold period".

At time T6 next, conversion to a current signal based on the potential difference between the N signal held in the sample-hold circuit 42 and the A+B signal held in the sample-hold circuit 44 is performed in the voltage-current conversion circuit 71. Also, a conversion operation to a digital signal is started in the AD conversion circuit 72. The period from time T6 until the conversion operation to a digital signal is completed in the AD conversion circuit 72 is denoted as "A+B signal conversion period".

At time T7 next, the selection transistor 34 is turned off, and the source of the amplification transistor 33 is cut off from the column output line 23. When the operation at time T7, and the A signal AD conversion period and A+B signal AD conversion period are ended, the operation for reading out signals of the pixels 21 belonging to the one row to the corresponding AD converters 46 via the respective column output lines 23 is ended.

In the second embodiment, even if the A signal AD conversion period is not ended at time T6, since the two voltage-current conversion circuits and the AD converters are provided, the AD conversion of the A+B signal can be started. Therefore, in a period after time T6, the AD conversion of the A signal and the AD conversion of the A+B signal can be performed in parallel, and the read-out operation period can be reduced relative to that of the first embodiment.

Third Embodiment

In the second embodiment described above, an example has been illustrated in which, as a result of arranging two voltage-current conversion circuits and two AD conversion circuits with respect to three sample-hold circuits, AD conversions are performed in parallel. When this configuration is used, even when the number of signals to be read out from the pixel has increased, AD conversions are performed in parallel in two AD converters, and the read-out time can be reduced, similarly to the second embodiment.

It is known that, when the number of photoelectric conversion elements included in one pixel is increased, focus detection can be executed with higher accuracy, and in the third embodiment, an example is illustrated in which three types of photodetection signals are read out from the pixel portion in addition to the reset signal.

Figure 10:
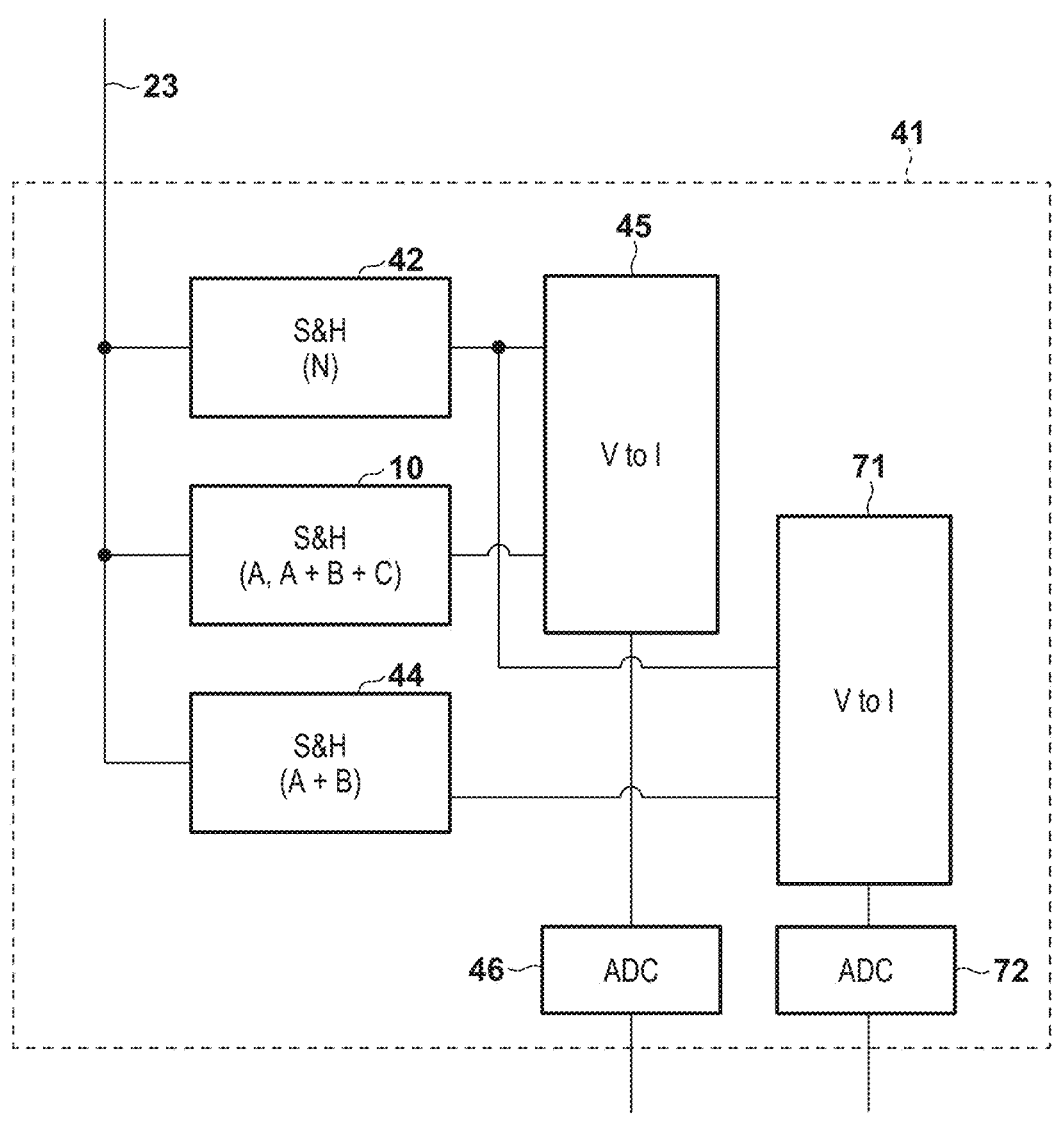
FIG. 10 is a simplified block diagram of a column circuit of the third embodiment.
Figure 11:
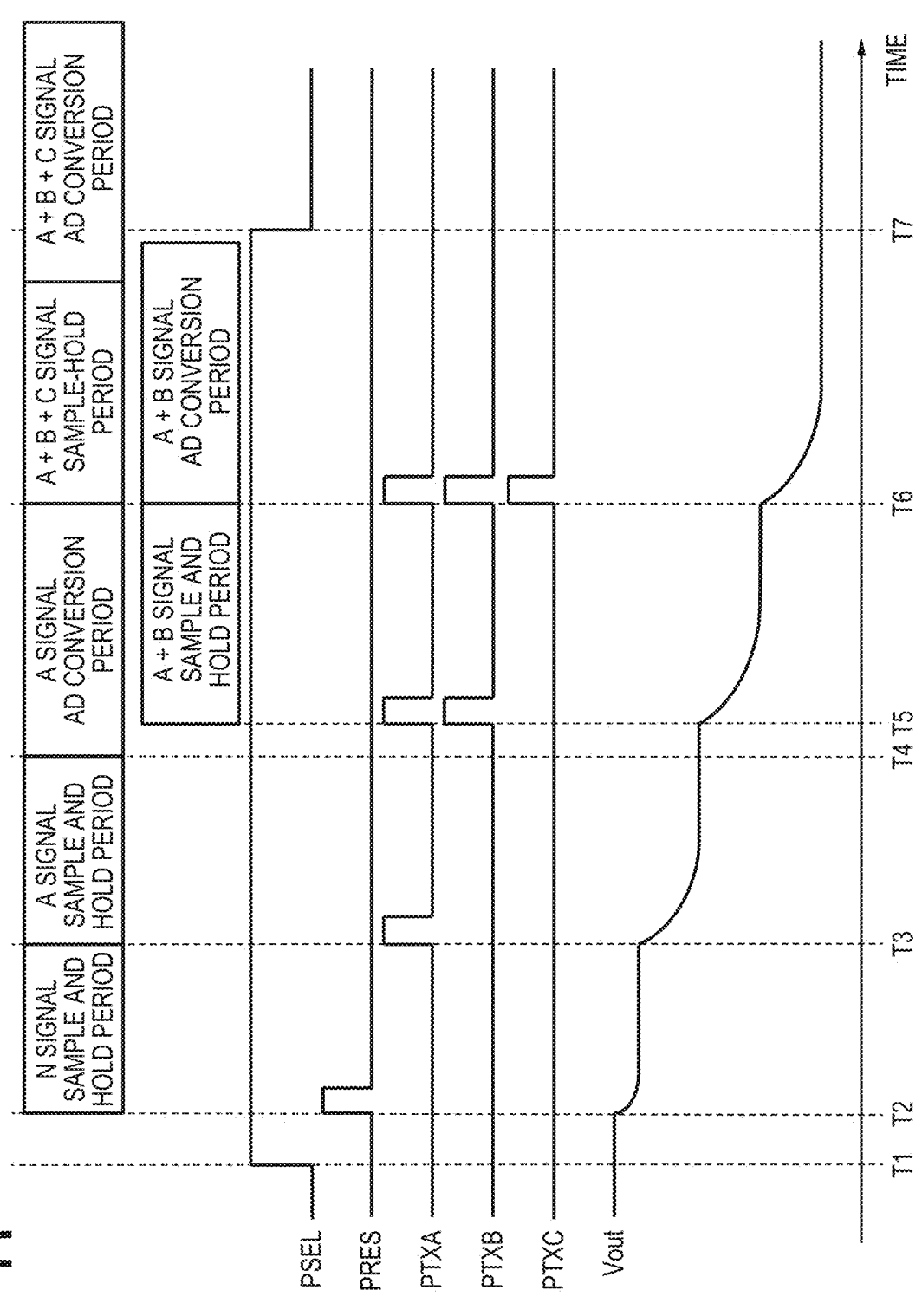
FIG. 11 is a timing chart of the third embodiment.

The third embodiment of the present invention will be described using FIGS. 9 to 11. In FIGS. 9 to 11, the constituent elements similar to those of the first and second embodiments will be given the same reference numerals, and the description thereof will be omitted or simplified.

FIG. 9 is an equivalent circuit diagram of a unit pixel in the third embodiment.

In addition to the pixel configuration in the first embodiment, a third photoelectric conversion portion 901, a fourth photoelectric conversion portion 902, a third transfer transistor 903, a fourth transfer transistor 904, and a signal line for supplying a control signal PTXC, which is a control signal line 22 connected to the vertical scanning unit 202, are included.

Different from the first and second embodiments, as a result of increasing the number of photoelectric conversion elements to four, when they are arranged in a 2×2 matrix, for example, signals for focus detection corresponding to the vertical direction and the horizontal direction can be obtained. The third transfer transistor 903 is arranged between the third photoelectric conversion portion 901 and the floating diffusion portion 31, and the fourth transfer transistor 904 is arranged between the fourth photoelectric conversion portion 902 and the floating diffusion portion 31. The gates of the third transfer transistor 903 and fourth transfer transistor 904 are connected to the signal line PTXC, and when the control signal is at an H level, the signals of the corresponding photoelectric conversion elements are transferred to the floating diffusion portion 31.

FIG. 10 is a simplified block diagram of the column circuit in the third embodiment. A sample-hold circuit 10 holds the A signal, and thereafter holds a later-described A+B+C signal.

FIG. 11 is a timing chart illustrating an example of a pixel signal read-out operation from a pixel to the AD converter, in the third embodiment. The operations prior to time T1 and from time T1 to time T6 are the same as those of the second embodiment, and therefore the description thereof will be omitted.

It is assumed that the A signal AD conversion period is ended at time T6, which is different from the second embodiment. Here, since the AD conversion of the held A signal has been completed, the sample-hold circuit 10 can hold a new signal. At time T6, the control signals PTXA, PTXB, and PTXC transition to an H level for a new signal holding operation. Accordingly, the charges accumulated in the first photoelectric conversion portion 301, second photoelectric conversion portion 302, third photoelectric conversion portion 901, and fourth photoelectric conversion portion 902 are transferred to the floating diffusion portion 31. Also, the potential of the floating diffusion portion 31 becomes a potential according to the transferred charges.

Even after the control signals PTXA, PTXB, and PTXC have transitioned to an L level, the potential of the floating diffusion portion 31 is held, and the potential Vout of the column output line 23 stabilizes to a potential according to the potential of the floating diffusion portion 31 by the amplification transistor 33. After Vout stabilizes, by the sample-hold operation of the sample-hold circuit 10, a third photodetection signal (also denoted as an "A+B+C signal") is held in the sample-hold circuit 10. The period from time T6 until the sample-hold operation of the A+B+C signal is completed is denoted as an "A+B+C signal sample-hold period".

On the other hand, the time T6 is also a time at which the A+B signal sample-hold period is ended, and from time T6, an AD conversion of the A+B signal is performed in the voltage-current conversion circuit 71 and the AD converter 72. The period from time T6 until the AD conversion of the A+B signal is completed is denoted as an "A+B signal AD conversion period". Here, even when the number of signals to be read out from a pixel has increased, as the case of the third photodetection signal, relative to the first embodiment, as a result of processing the sample-hold and AD conversion of signals in parallel, as in the period after time T6, the read-out time can be reduced. The period from when the A+B+C signal sample-hold period is ended until the AD conversion of the A+B+C signal is ended is denoted as an "A+B+C signal AD conversion period".

Also, as in FIG. 11, when the A+B+C signal sample-hold period is ended in the A+B signal AD conversion period, since the two voltage-current conversion circuits and the two AD converter are provided in the column circuit, the AD conversion of the A+B+C signal can be started using the voltage-current conversion circuit 45 and AD converter 46. As described above, even when the number of signals to be read out from a pixel has increased, as a result of performing AD conversions in parallel using two AD converters, as in the second embodiment, the read-out time can be reduced.

In the third embodiment, even when the number of signals to be read out from a pixel is three, with the configuration of the column circuit of the second embodiment, the read-out time can be reduced. Specifically, after the AD conversion of a first pixel signal (A signal AD conversion period) is ended, and the sample-hold operation of a second pixel signal (A+B signal sample-hold period) is ended, a third pixel signal becomes held in a sample-hold capacitor (A+B+C signal sample-hold period). Then, by overlapping the A+B+C signal sample-hold period and the A+B signal AD conversion period, and by overlapping the A+B signal AD conversion period and the A+B+C signal AD conversion period, the read-out time can be reduced.

Fourth Embodiment

The fourth embodiment is an example in which four sample-hold circuits, two voltage-current conversion circuits, and two AD converters are provided with respect to one pixel, and the read-out time is reduced by performing read-out operations of signals from photoelectric conversion elements in parallel.

The read-out operations of signals from photoelectric conversion elements in the fourth embodiment of the present invention will be described below with reference to FIGS. 12 to 14. The description of portions similar to the first to third embodiments will be omitted or simplified.

Figure 12:
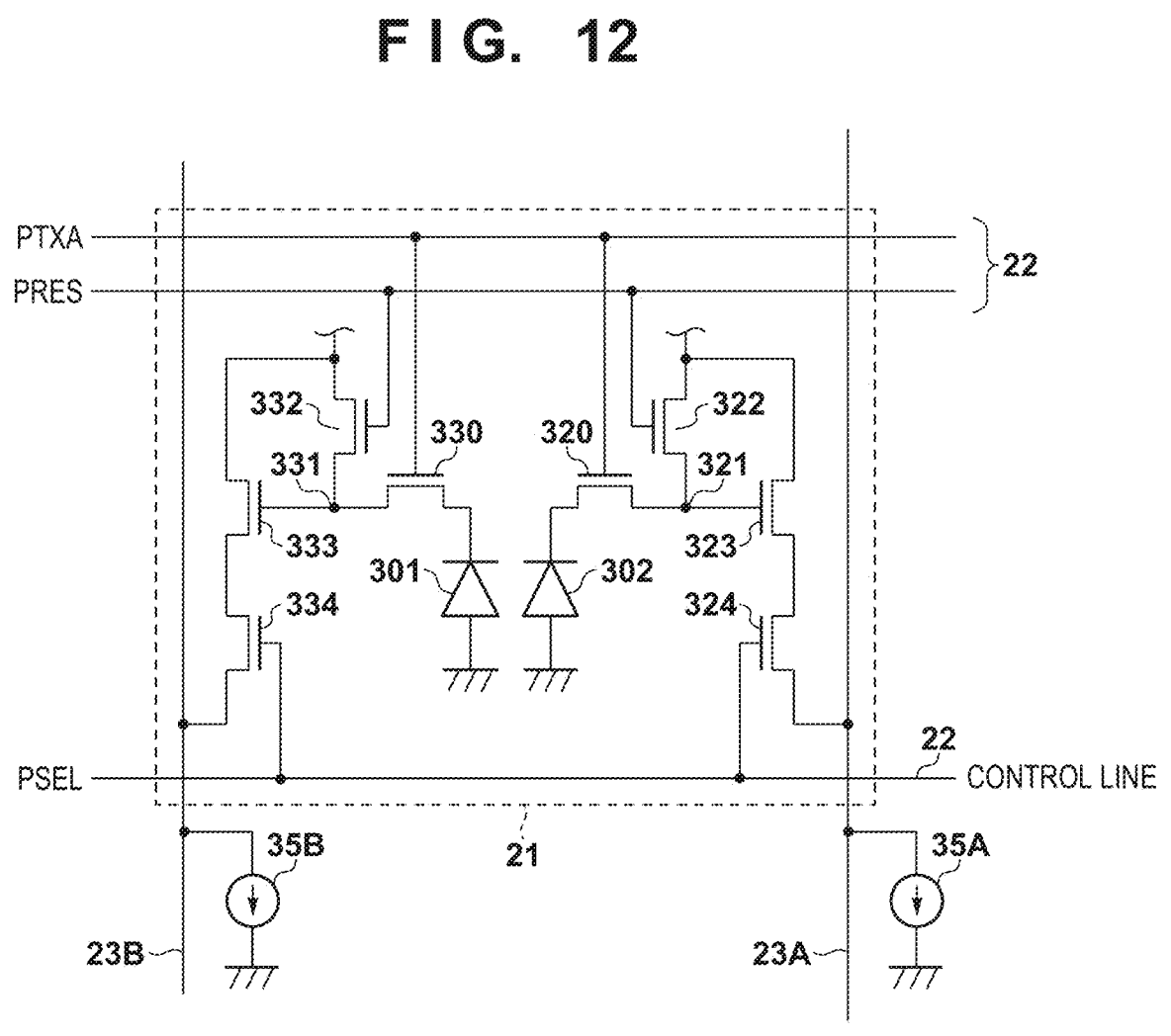

FIG. 12 is an equivalent circuit diagram of a unit pixel in the fourth embodiment. A reset transistor 332 and a reset transistor 322 are respectively connected to a floating diffusion portion 331 and a floating diffusion portion 321, and reset the floating diffusion portions to a power supply voltage by a control signal PRES. Signal output nodes of the first photoelectric conversion portion 301 and the second photoelectric conversion portion 302 are respectively connected to a transfer transistor 330 and a transfer transistor 320. Also, these signals (from the signal output nodes) are respectively transferred to the different floating diffusion portion 331 and floating diffusion portion 321 by the control signal PTXA output from the vertical scanning unit 202.

An amplification transistor 333 is for amplifying and output the signal accumulated in the floating diffusion portion 331 to a column output line 23B. A selection transistor 334 is located between the amplification transistor 333 and the column output line 23B, and is for controlling electrical conduction by a control signal PSEL output from the vertical scanning unit 202. An amplification transistor 323 is for amplifying and output the signal accumulated in the floating diffusion portion 321 to a column output line 23A. A selection transistor 324 is located between the amplification transistor 323 and the column output line 23A, and is for controlling electrical conduction by the control signal PSEL output from the vertical scanning unit 202.

A current source 35B is electrically connected to the column output line 23B. The current source 35B supplies a bias current to the amplification transistor 333, and the amplification transistor 333 and the current source 35B constitute a source follower.

A current source 35A is electrically connected to the column output line 23A. The current source 35A supplies a bias current to the amplification transistor 323, and the amplification transistor 323 and the current source 35A constitute a source follower.

Figure 13:
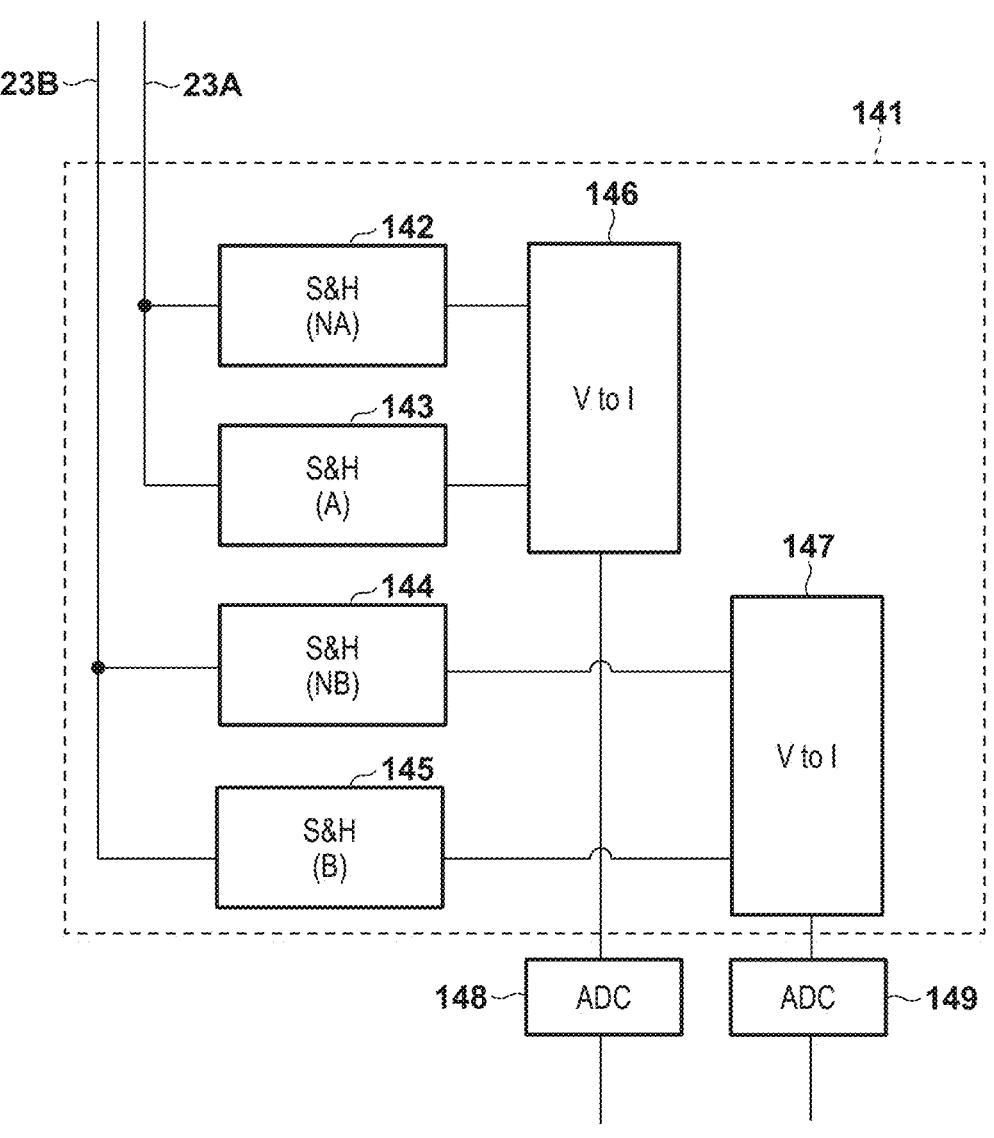
FIG. 13 is a simplified block diagram of a column circuit of the fourth embodiment.

FIG. 13 is a simplified block diagram of a column circuit 141 in the fourth embodiment. A plurality of the column circuits 141 are arranged in the column circuit unit 210, and each column circuit 141 is connected to a corresponding output line of the pixel array portion.

A sample-hold circuit 144 and a sample-hold circuit 145 are connected to the column output line 23B. A voltage-current conversion circuit 147 is connected to the output nodes of the sample-hold circuit 144 and the sample-hold circuit 145, and the output node of the voltage-current conversion circuit 147 is connected to an AD converter 149.

A sample-hold circuit 142 and a sample-hold circuit 143 are connected to the column output line 23A. A voltage-current conversion circuit 146 is connected to the output nodes of the sample-hold circuit 142 and the sample-hold circuit 143, and the output node of the voltage-current conversion circuit 146 is connected to an AD converter 148. The output nodes of the AD converter 148 and AD converter 149 are connected to the digital memory unit 211.

FIG. 14 is a timing chart illustrating a read-out operation in a period in which a signal is output from a pixel and the signal is AD converted, in the fourth embodiment. In FIG. 14, the control signals PSEL, PRES, and PTXA that are output from the vertical scanning unit 202 to one row, and output potentials VoutA and VoutB that are respectively output to the column output lines 23A and 23B are shown.

It is assumed that the control signals PSEL, PRES, and PTXA are at a Low level, in a period prior to time T11. Also, It is assumed that charges according to an incident light amount is accumulated in each of the first photoelectric conversion portion 301 and the second photoelectric conversion portion 302.

At time T11, the vertical scanning unit 202 controls the control signal PSEL to transition from an L level to an H level. With this, the selection transistor 334 and selection transistor 324 are turned on. Also, the source of the amplification transistor 333 is connected to the column output line 23B via the selection transistor 334, and the source of the amplification transistor 323 is connected to the column output line 23A via the selection transistor 324.

In a next predetermined period from time T12, the vertical scanning unit 202 controls the control signal PRES to transition from an L level to an H level. With this, the reset transistor 332 and reset transistor 322 are turned on, and the potentials of the floating diffusion portion 331 and floating diffusion portion 321 are reset to a predetermined potential (reset potential) according to a reference potential.

This state is a reset state of the pixel 21. Accordingly, the output potentials VoutA and VoutB of the respective column output line 23A and column output line 23B respectively become the potentials according to the reset potentials of the floating diffusion portion 331 and floating diffusion portion 321. Sample-hold operation is performed on these potentials in a period after the reset transistor 332 and reset transistor 322 are turned off and the potentials of the column output line 23B and column output line 23A have stabilized until time T13. Accordingly, a reset signal (denoted as "NA signal") based on the reset potential of the floating diffusion portion 321 is held in the sample-hold circuit 142 and sample-hold circuit 143. The period from time T12 to time T13 includes a stabilizing time of the column output line 23A and the time for sample-holding the NA signal, and is denoted as an "NA signal sample-hold period".

Also, a reset signal (denoted as "NB signal") based on the reset potential of the floating diffusion portion 331 is held in the sample-hold circuit 144 and sample-hold circuit 145. The period from time T12 to time T13 also includes a stabilizing time of the column output line 23B and the time for sample-holding the NB signal, and is also denoted as an "NB signal sample-hold period".

In a next predetermined period from time T13, the vertical scanning unit 202 controls the control signal PTXA to transition from an L level to an H level. With this, the transfer transistor 330 is turned on, and the charges accumulated in the first photoelectric conversion portion 301 is transferred to the floating diffusion portion 331. Also, the potential of the floating diffusion portion 331 becomes a potential according to the amount of charges transferred from the photoelectric conversion portion. Accordingly, the output potential VoutB of the column output line 23B becomes a potential according to the amount of charges transferred to the floating diffusion portion 331. This potential is sample-held by the sample-hold circuit 145 in a period after the transfer transistor 330 is turned off and the potential of the column output line 23B has stabilized until time T14. This signal is held in the sample-hold circuit 145 as a first photodetection signal (also denoted as a "B signal"). The period from time T13 to time T14 includes a stabilizing time of the column output line 23B and a write time of the B signal to the sample-hold circuit 145, and is denoted as a "B signal sample-hold period".

On the other hand, by controlling the control signal PTXA to transition from an L level to an H level, the transfer transistor 320 is also turned on, the charges accumulated in the second photoelectric conversion portion 302 is transferred to the floating diffusion portion 321. Also, the potential of the floating diffusion portion 321 becomes a potential according to the amount of charges transferred from the photoelectric conversion portion. Accordingly, the output potential VoutA of the column output line 23A becomes a potential according to the amount of charges transferred to the floating diffusion portion 321. This potential is sample-held by the sample-hold circuit 143 in a period after the transfer transistor 320 is turned off and the potential of the column output line 23A has stabilized until time T14. This signal is held in the sample-hold circuit 143 as a second photodetection signal (also denoted as a "A signal"). The period from time T13 to time T14 includes a stabilizing time of the column output line 23A and a write time of the A signal to the sample-hold circuit 143, and is denoted as a "A signal sample-hold period".

In a next predetermined period from time T14, the signals held in the sample-hold circuit 142 and sample-hold circuit 143 are transmitted to the voltage-current conversion circuit 146 by control signals (not illustrated) output from the control unit 203. A current signal based on the difference between the A signal and the NA signal is output from the voltage-current conversion circuit 146 to the AD converter 148, as a signal subjected to correction processing by correlated double sampling.

The current signal input to the AD converter 148 is converted to a digital signal, and the converted digital signal is stored in the digital memory unit 211. The period from time T14 until this converted digital signal is obtained is denoted as an "A signal AD conversion period".

Here, in the voltage-current conversion circuit 147 as well, after time T14, the signals held in the sample-hold circuit 144 and sample-hold circuit 145 are transmitted to the voltage-current conversion circuit 147. Also, a current signal based on the potential difference between the B signal and the NB signal is output to the AD converter 149, as a signal subjected to correction processing by correlated double sampling.

The current signal input to the AD converter 149 is converted to a digital signal, and the converted digital signal is stored in the digital memory unit 211. The period from time T14 until this converted digital signal is obtained is also denoted as a "B signal AD conversion period".

At time T15 next, the vertical scanning unit 202 controls the control signal PSEL to transition from an H level to an L level. Accordingly, the selection transistor 334 and selection transistor 324 are turned off. Then, the source of the amplification transistor 333 is cut off from the column output line 23B, and the source of the amplification transistor 323 is cut off from the column output line 23A. When the operation at time T15, the A signal AD conversion period, and B signal AD conversion period are ended, the read-out operation until the signals of the pixels 21 belonging to the one row are AD converted is ended.

In the fourth embodiment, four sample-hold circuits, two voltage-current conversion circuits, and two AD converters are provided with respect to one pixel. Accordingly, the period in which the A signal is sample-held and AD converted can be overlapped with the period in which the B signal is sample-held and AD converted, and therefore the read-out operation period can be reduced.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-103596, filed Jun. 23, 2023, which is hereby incorporated by reference herein in its entirety.

What is claimed is:

1. An image capturing apparatus comprising:
a pixel portion in which a plurality of pixels each including a plurality of photoelectric conversion elements are arranged in a matrix;
at least three sample-hold circuits that are arranged with respect to pixel signals output from one pixel;
a voltage-current conversion portion configured to output a difference between two sample-hold circuits, out of the at least three sample-hold circuits, as a current signal;
a first and a second AD converters configured to convert an output signal of the voltage-current conversion portion to a digital signal; and
at least one processor or circuit configured to function as:
a control unit configured to perform control such that a first pixel signal obtained from the pixel is held in one sample-hold circuit, out of the at least three sample-hold circuits and a second pixel signal obtained from the pixel become held in another sample-hold circuit, out of the at least three sample-hold circuits, and in a period in which the first pixel signal is AD converted by the first AD converter, an operation is started in which the second pixel signal is AD converted by the second AD converter.

2. The image capturing apparatus according to claim 1, wherein the control unit causes the at least three sample-hold circuits to hold a reset signal of the pixel.

3. The image capturing apparatus according to claim 1, wherein the first pixel signal is a signal based on charges of at least one photoelectric conversion element of one of the pixels, and the second pixel signal is a signal based on charges of a plurality of photoelectric conversion elements of the one pixel.

4. The image capturing apparatus according to claim 1, wherein the control unit performs control such that, after the AD conversion of the first pixel signal is ended, and the second pixel signal is sample-held, an operation is stared in which a sample-hold circuit that held the first pixel signal is caused to hold a third pixel signal.

5. The image capturing apparatus according to claim 1, wherein the AD converter includes a delta-sigma type AD converter.

6. An image capturing apparatus comprising:
a pixel portion in which a plurality of pixels each including a plurality of photoelectric conversion elements are arranged in a matrix;

17 at least three sample-hold circuits that are arranged with respect to pixel signals output from one pixel;

a voltage-current conversion portion configured to output a difference between two sample-hold circuits, out of the at least three sample-hold circuits, as a current signal;

a first and a second AD converters configured to convert an output signal of the voltage-current conversion portion to a digital signal; and at least one processor or circuit configured to function as:

a control unit configured to perform control such that a first pixel signal obtained from the pixel is held in one sample-hold circuit, out of the at least three sample-hold circuits and a second pixel signal obtained from the pixel become held in another sample-hold circuit, out of the at least three sample-hold circuits, and in a period in which the first pixel signal is AD converted by the first AD converter, an operation is started in which the first pixel signal is AD converted by the second AD converter, wherein the first pixel signal is a signal based on charges of at least one photoelectric conversion element of one of the pixels, and the second pixel signal is a signal based on charges of another conversion element of the one pixel.

7. A method of controlling an image capturing apparatus including: a pixel portion in which a plurality of pixels each including a plurality of photoelectric conversion elements are arranged in a matrix; at least three sample-hold circuits that are arranged with respect to pixel signals output from one pixel; a voltage-current conversion portion configured to output a difference between two sample-hold circuits, out of the at least three sample-hold circuits, as a current signal; and a first and a second AD converters configured to convert an output signal of the voltage-current conversion portion to a digital signal, the method comprising:

18 performing control such that a first pixel signal obtained from the pixel is held in one sample-hold circuit, out of the at least three sample-hold circuits and a second pixel signal obtained from the pixel become held in another sample-hold circuit, out of the at least three sample-hold circuits, and in a period in which the first pixel signal is AD converted by the first AD converter, an operation is started in which the second pixel signal is AD converted by the second AD converter.

8. A method of controlling an image capturing apparatus including: a pixel portion in which a plurality of pixels each including a plurality of photoelectric conversion elements are arranged in a matrix; at least three sample-hold circuits that are arranged with respect to pixel signals output from one pixel; a voltage-current conversion portion configured to output a difference between two sample-hold circuits, out of the at least three sample-hold circuits, as a current signal; and a first and a second AD converters configured to convert an output signal of the voltage-current conversion portion to a digital signal, the method comprising:

performing control such that a first pixel signal obtained from the pixel is held in one sample-hold circuit, out of the at least three sample-hold circuits, and a second pixel signal obtained from the pixel become held in another sample-hold circuit, out of the at least three sample-hold circuits, and in a period in which the first pixel signal is AD converted by the first AD converter, an operation is started in which the first pixel signal is AD converted by the second AD converter, wherein the first pixel signal is a signal based on charges of at least one photoelectric conversion element of one of the pixels, and the second pixel signal is a signal based on charges of another conversion element of the one pixel.

* * * * *